(12) United States Patent
Pavlou

(10) Patent No.: US 11,513,757 B1
(45) Date of Patent: Nov. 29, 2022

(54) DISPLAY SCREEN CASTING TO TARGET DEVICE USING CASTING EXTENSION

(71) Applicant: Citrix Systems, Inc., Fort Lauderdale, FL (US)

(72) Inventor: Chris Pavlou, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/339,419

(22) Filed: Jun. 4, 2021

(51) Int. Cl.
| | |
|---|---|
| *G06F 3/14* | (2006.01) |
| *G06F 3/0481* | (2022.01) |
| *G06K 7/14* | (2006.01) |
| *G06F 3/01* | (2006.01) |
| *G06T 1/60* | (2006.01) |
| *H04N 5/272* | (2006.01) |

(52) U.S. Cl.
CPC ............ *G06F 3/1454* (2013.01); *G06F 3/017* (2013.01); *G06F 3/0481* (2013.01); *G06K 7/1417* (2013.01); *G06T 1/60* (2013.01); *H04N 5/272* (2013.01)

(58) Field of Classification Search
CPC ...... G06F 3/1454; G06F 3/017; G06F 3/0481; G06K 7/1417; G06T 1/60; H04N 5/272
See application file for complete search history.

(56) References Cited

U.S. PATENT DOCUMENTS

| | | | | |
|---|---|---|---|---|
| 8,341,624 | B1 * | 12/2012 | Hobbs | ................. H04N 19/152 718/1 |
| 8,898,722 | B2 | 11/2014 | Reisman | |
| 9,521,455 | B1 * | 12/2016 | Gupta | .............. H04N 21/47217 |
| 9,836,437 | B2 * | 12/2017 | Wiitala | ................. G06F 3/1454 |
| 2015/0067181 | A1 * | 3/2015 | Roy | ........................ H04L 67/02 709/227 |
| 2017/0085609 | A1 | 3/2017 | Clay et al. | |
| 2018/0275835 | A1 * | 9/2018 | Prag | .................... G06F 3/04845 |
| 2020/0128056 | A1 * | 4/2020 | Simotas | ............... H04L 65/605 |

FOREIGN PATENT DOCUMENTS

| | | | | |
|---|---|---|---|---|
| CN | 110381345 | A | 10/2019 | |
| WO | WO-2014036568 | A1 * | 3/2014 | .......... G06F 1/1626 |
| WO | 2014151397 | A1 | 9/2014 | |

OTHER PUBLICATIONS

International Search Report for International Application No. PCT/US2022/0031067 mailed from the International Searching Authority (EPO) dated Sep. 13, 2022, 14 pages.

* cited by examiner

*Primary Examiner* — Jacinta M Crawford
*Assistant Examiner* — Donna J. Ricks
(74) *Attorney, Agent, or Firm* — BainwoodHuang

(57) ABSTRACT

A method of casting a source device display screen to a target device includes, by an application on the source device, storing information about the target device in a shared memory and issuing a request to an operating system to initiate capturing and casting for the source device display screen. The operating system responds to the request by launching a casting extension and supplying a content stream containing content of the source device display screen. Upon being launched, the casting extension (1) obtains the information about the target device from the shared memory and uses the information to establish a display connection with the target device, and (2) forwards the content stream to the target device on the display connection.

19 Claims, 4 Drawing Sheets

DISPLAY SCREEN CASTING TO TARGET DEVICE USING CASTING EXTENSION

BACKGROUND

The invention is related to the field of remote display of content such as a display screen of a personal device (e.g., smartphone, tablet).

SUMMARY

A method is disclosed of casting a source device display screen to a target device. The method includes, by an application on the source device, storing information about the target device in a shared memory and issuing a request to an operating system to initiate capturing and casting for the source device display screen. The operating system responds to the request by launching a casting extension and supplying a content stream containing content of the source device display screen. Upon being launched, the casting extension (1) obtains the information about the target device from the shared memory and uses the information to establish a display connection with the target device, and (2) forwards the content stream to the target device on the display connection. The use a casting extension enables the remote display of source device screen content when the source device operating system does not natively support a display protocol of the target device. A main portion of the application can be separately responsible for obtaining the target device information, such as by scanning a QR code displayed on its display, as well as other application function such as user interface functions, so that the casting extension can comply with functional limitations imposed by the source device operating system for security or related reasons.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
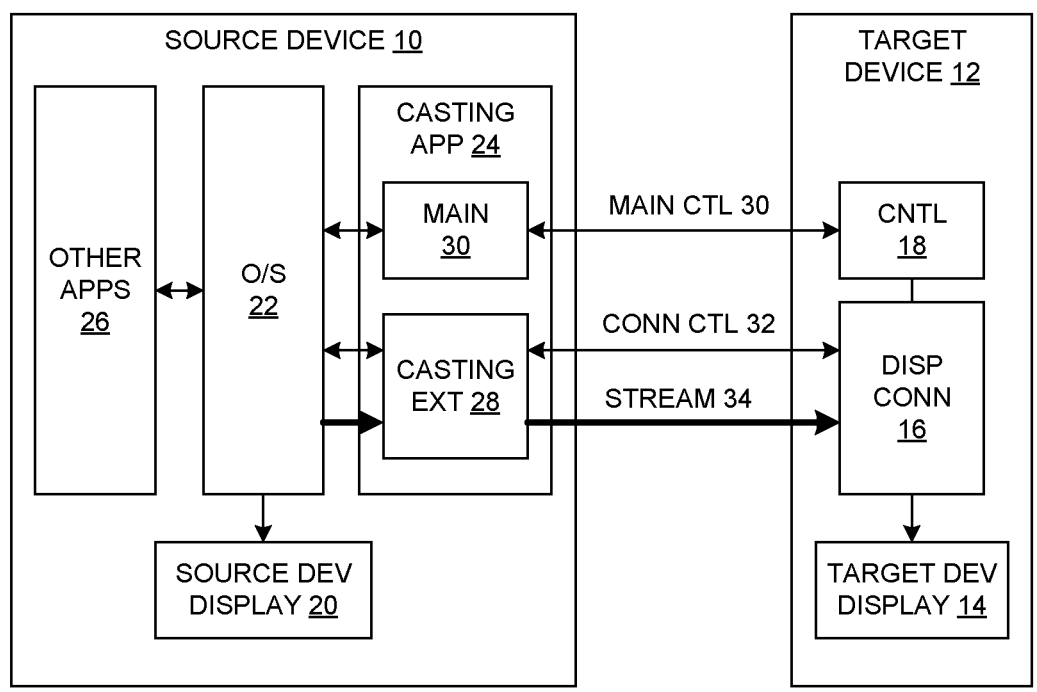
FIG. 1 is a block diagram of a system providing for screen casting between a source device and a target device.

The disclosed technique is directed to situations in which content on one computerized device (e.g., a smart phone or other personal device, referred to as a "source device") is to be shared with a larger audience and displayed on a separate screen, such as for better readability or collaboration for example. Generally the separate screen will be part of, or accessed via, a separate device, referred to as a "target device". In one embodiment the target device is a specialized device known as a Citrix Ready workspace hub. Content can include things like presentations, documents, photos, videos or audio/video being captured real-time.

Although techniques for casting content to other devices are generally known, the disclosed technique is directed to a particular need for which no solution is known to exist. In some known arrangements, the target device natively supports a particular remote-casting protocol of the source device, such as Apple AirPlay® for example, and thus the source device screen can be fully shared to the target device using this available protocol. This means that content of any application that is displayed on the source device screen (whether windowed or not) can be shared in this manner. In other arrangements, a target device may support a specialized protocol such as Citrix Remote Desktop, and then can display content captured by a remote desktop application executing on the source device. However, there are other situations in which it is desired to remotely display a native source device screen (e.g., a smartphone screen) on a separate target device where the two devices do not support a common remote-display protocol. As a particular example, there is no built-in connectivity between an iOS device and a device such as a Citrix Ready workspace hub that lacks support for AirPlay. When it is desired to share content from an iPhone or iPad (generally, iOS device) it has not been possible to share the native iOS screen.

A disclosed technique uses available functions of the source device operating system (e.g., "Replay Kit" in iOS) to start a capture of the native iOS screen and broadcast to a separate target device (e.g., Citrix Ready workspace hub). The screen capture and streaming itself takes place in a 'broadcast upload extension' which is part of a specialized application (app) executing on the source device. In the iOS environment, broadcast streaming can be done only by use of such broadcast extensions as a security measure—extensions have limited functionality in order to protect against certain types of security risks. However, the limitation on functionality generally prevents the extension itself from performing other tasks needed in connection with screen sharing of the type described herein.

In one arrangement the application is responsible for establishing a casting session with the workspace hub by scanning a QR code displayed on the hub to obtain information for connecting to the hub, then using that information to establish the casting session. This phase of operation is performed by the main application and not the broadcast extension, because the extension is just a process that runs in the background and has no user interface (UI) and therefore is unable to show a QR code scanner or any alerts that may be needed when establishing a casting session to a hub. Once the casting session is established, the application asks iOS to prompt for a broadcast session. The user can then tap Start Broadcast and after a 3 sec countdown the screen capture begins. This latter step is part of iOS and is required and cannot be changed. During the countdown, the user can leave that screen if they want to and go to the home screen or to any other application. Once the countdown reaches zero, the application extension is launched. The application extension, using a configuration shared with it by the host application, connects with the hub and begins streaming the contents of the screen as provided by iOS.

During the broadcast, the user can go to any application on the device and rotate the device as needed. Additional info added to the video screen can include relevant info such as the IP address of the iOS device and the name of the iOS device. Other helpful info can include the screen resolution of the video and the FPS (frames per second) of the video stream. The broadcast session can be stopped either from within the application or from the iOS Control Center or by locking the screen. In any case, once the extension is notified that the session has ended, it has enough time to stop the casting service on the hub. The hub then goes back to showing the QR code.

The disclosed technique addresses a particular aspect of operating systems such as iOS that require use of a broadcast extension for screen capture and streaming. Due to the limitations iOS imposes on the broadcast extension, it cannot show a user interface (UI), and therefore it cannot scan for a QR code or show any network or security prompts that may come up when connecting to a workspace hub. The solution is for the main portion of the application to take care of scanning the QR code, start the display connector on the hub, and deal with any prompts, then share the configuration and other connection details with the broadcast extension to enable it to connect to the display connector and begin broadcasting the screen contents. In one embodiment the configuration sharing is possible using an application group that both the main application and its extension both are members of.

The technique may be realized in different ways. The application on the source device may be purpose-built or it may be one that also provides other functionality in relation to the target device. As an example, the application may be an enhanced version of an existing application known as Citrix Workspace for iOS, which also supports other non-native-screen types of casting to a workspace hub. Furthermore, the target device could be reached via a service-based intermediate or proxy type of device rather than directly. Generally, the technique enables casting a native iOS screen to a target device such as a Citrix Ready workspace hub.

Specific features that may be realized with the technique include:
- Additional details shown on video stream (i.e., an overlay of information such as a logo, device name, description of broadcast stream type/rate) can be helpful during presentations and team collaboration
- Can be used with existing target device installations and operating system versions, without requiring upgrades;
- The target casting device could be a service-based casting target, not necessarily a physical workspace hub.

Description of Embodiments

FIG. 1 shows a representative system environment having computerized devices shown as a source device 10 and target device 12, where the labels "source" and "target" refer to the origin and destination for a screen capture broadcast stream as described herein. In one embodiment the target device 12 is a shareable device intended for use in collaboration, such as the Workspace Hub from Citrix Systems, Inc. The source device 10 may be a personal device such as a smartphone or tablet, or in some cases a desktop personal computer for example.

The target device 12 includes a target device display 14, specialized display-related logic shown as a display connector 16, and control logic 18. The source device 10 includes a source device display 20 and several software-implemented components shown as an operating system (O/S) 22, a casting application (app) 24, and other applications (apps) 26. As shown, the casting app 24 includes a casting extension (ext) 28 and a main portion 30. The casting extension 28 is also referred to as a broadcast extension or broadcast upload extension herein, and the main portion 30 may also be referred to as the main application. The important distinction between these components is that the main portion 30 has typical application functionality and configuration, including an ability to interact with the target device 12 and a user as part of overall control of operation as described herein, while the casting extension 28 essentially has more constrained functionality for handling of broadcast streams in particular, and essentially becomes a limited-purpose extension of the operating system 22 in operation. The other apps 26 are those that provide content that is displayed on the source device display 20 (in conventional fashion) and then streamed to the target device 12 as described herein. Example other applications 26 include a word processing application, spreadsheet application, web browser, etc.

Also shown in FIG. 1 are three types of communications activity occurring between the source device 10 and target device 12, namely main control 30, connection control 32, and a stream 34. The stream 34 is a broadcast stream carrying captured screen content of the source device display 20. The main control communications 30 is for high-level control such as initiating a session, obtaining connection information, etc. The connection control communications 32 occurs between the casting extension 28 and display connector 18 to establish the streaming connection/channel 34 between them. Details of all these communications are provided below. Although not shown in FIG. 1, there is also a memory-based communication mechanism in the source device 10 enabling the main portion 30 of the casting app 24 to communicate information to the casting extension 28 to enable it to establish a connection to the target device 12, as also described more below.

The source device 10 and target device 12 are computerized devices typically including one or more processors, memory, and interface circuitry interconnected by data interconnections such as one or more high-speed data buses. The interface circuitry provides a hardware connection to communications circuitry (e.g., wireless communications circuitry and generally other external devices/connections. There may also be local storage such as a local-attached disk drive or Flash drive. In operation, the memory stores data and instructions of system software (e.g., operating system 22, control 18) and one or more application programs (24, 26, 16) which are executed by the processor(s) to cause the hardware to function in a software-defined manner. The application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 2:
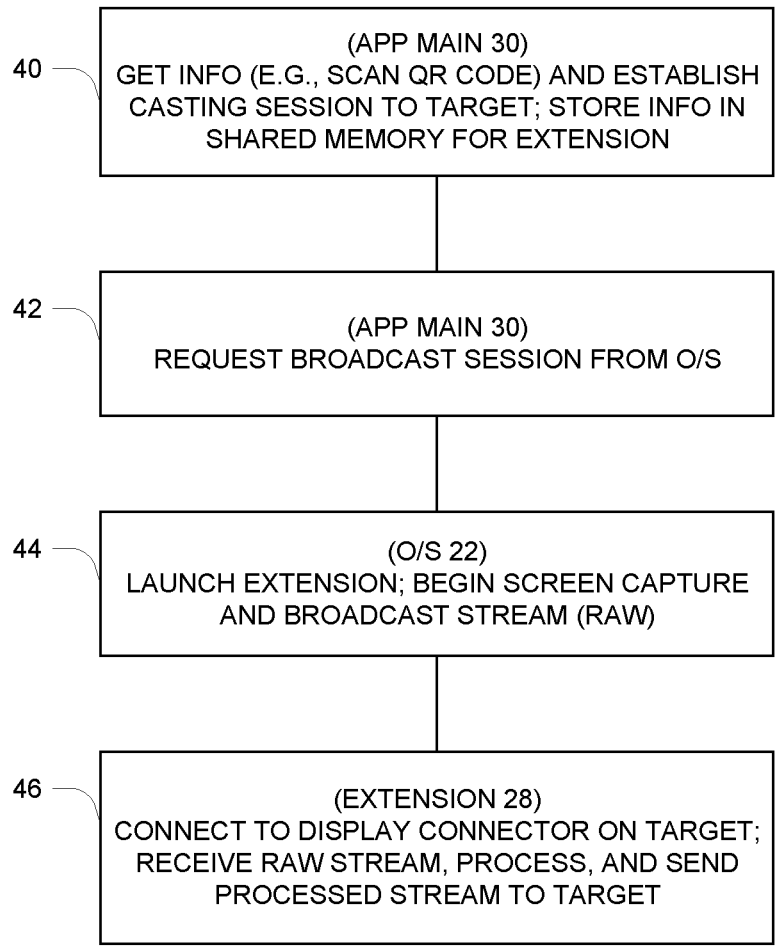
FIG. 2 is a flow diagram of operation of the system of FIG. 1.

FIG. 2 illustrates operation of the system of FIG. 1 in pertinent part. At 40, the app main portion 30 obtains information regarding the target device 12, which includes a network address of the target device 12 among other information. In the case of a workspace hub, this information may be encoded into a QR code that is displayed on its display 14, where the QR code can be scanned by the source device 10. The main portion 30 includes functionality for interpreting (decoding) the QR code, to obtain the network address and other information. The main portion 30 then uses the information to establish a casting session with the target device 12, and also stores the target device information in a shared memory of the source device 10 where it can later be accessed by the casting extension 28, as described more below. The communications for establishing the casting session are part of the main control 30 shown in FIG. 1. At 42, the app main portion 30 issues a request to the operating system 22 to initiate screen capturing and broadcasting of the screen content. In response, at 44 the operating system 22 launches the casting extension 28, begins screen capture, and provides the screen capture content as a stream to the casting extension 28. This stream is referred to as the "raw"

broadcast stream to distinguish it from the "processed" stream generated by the casting extension 28 and sent to the target device 12. The essential content of these two streams will generally be the same, but there is an opportunity for the casting extension 28 to modify the raw stream in any of a variety of ways to generate the processed stream. Examples include frame re-encoding, and selective frame dropping for bandwidth management. It is noted here that "screen capture" refers to capturing the content of the source device display 20 as rendered by the operating system 22, including for example the content of application windows, icons for apps and O/S features, and other graphical items. As a user manipulates display screen content by using one or more applications 26 and other features, all such display screen content is represented in the raw broadcast stream generated by the operating system 22 and provided to the casting extension 28.

At 46, the casting extension 28 (which has begun execution upon launch by the operating system 22 at 44) first establishes a connection to the display connector 18 of the target device 12, and then begins receiving the raw stream, processing it as necessary, and sending the processed stream to the display connector 18 as stream 34 (FIG. 1). In the initial connection establishment operation, the casting extension 28 obtains the target device information from the shared memory where the information was previously stored by the app main portion 30. This information enables the casting extension 28 to generate the connection control 32 communications with the display connector 18 and to establish the stream 34 to it. As the processed stream 34 is delivered, the display connector 16 renders the stream content on the target device display 14. Techniques for such rendering of stream content are generally known and not elaborated herein. During ongoing operation, the content of the source device display 20 is constantly mirrored to the target device display 14, with the possibility of additions/modifications by processing of the casting extension 28 as mentioned above.

Figure 3:
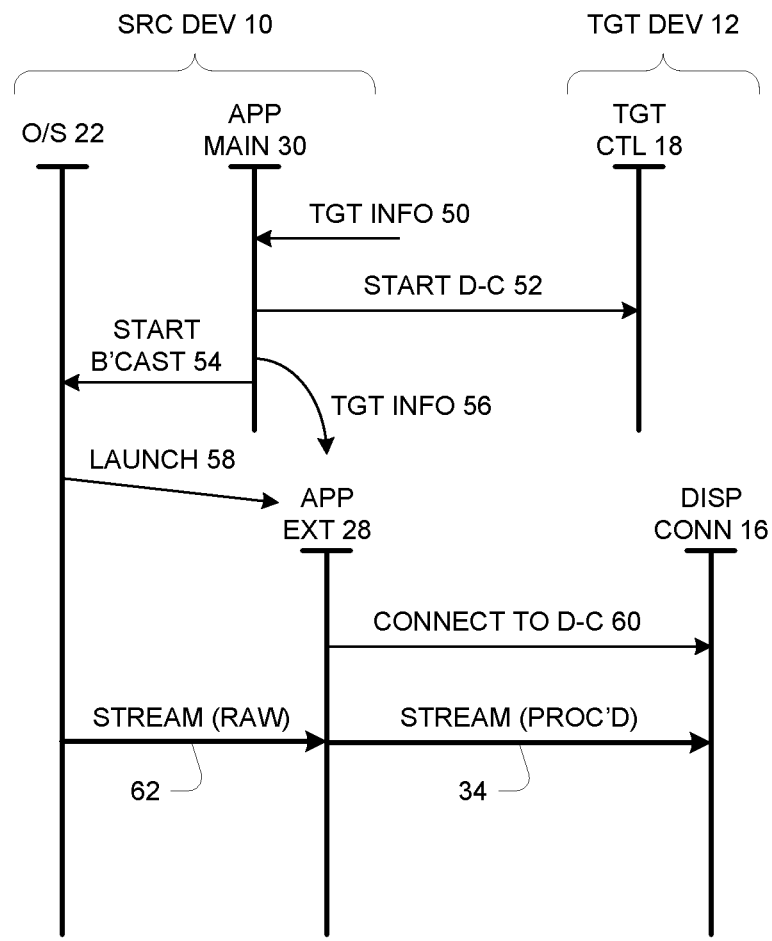
FIG. 3 is a messaging diagram for operation of the system of FIG. 1.

FIG. 3 illustrates operation in the form of a messaging-type diagram, with component interactions occurring horizontally and time proceeding vertically downward. Beginning at the top, the app main portion 30 obtains the target information 50 as explained above (e.g., by scanning a QR code), then takes three actions: issuing a Start Display Connector (D-C) message 52 to the target control 18; issuing a Start Broadcast request 54 to the operating system 22; and storing the target device information (TGT INFO) 56 in the shared memory. The target control 18 responds to the Start Display Connector message 52 by initializing operation of the display connector 16, which enters a state of waiting for an external connection.

The operating system 22 responds to the Start Broadcast request 54 by initiating the ongoing capturing of screen contents of the source device display 20, performing a launch operation 58 to launch the casting extension 28, and generating the raw broadcast stream 62, containing the captured screen content, and delivering it to the casting extension 28. In turn, the casting extension 28 first issues a Connect to Display Connector message 60 to the target device 12 which results in establishing a persistent connection between the casting extension 28 and display connector 16 over which the processed (proc'd) stream 34 is delivered and used to generate corresponding display on the target device display 14, as explained above.

The application 24 may include gesture-related functionality for detecting and interpreting gestures made with the source device 10 and potentially modifying the processed broadcast stream 34 accordingly. The gestures may include a privacy gesture indicating that content appearing on a display of the source device is not to be displayed on the target device, and the application responds by generating the processed broadcast stream so as to remove the content that is not to be displayed. An example privacy gesture is turning the source device 10 over to be face-down.

Figure 4:
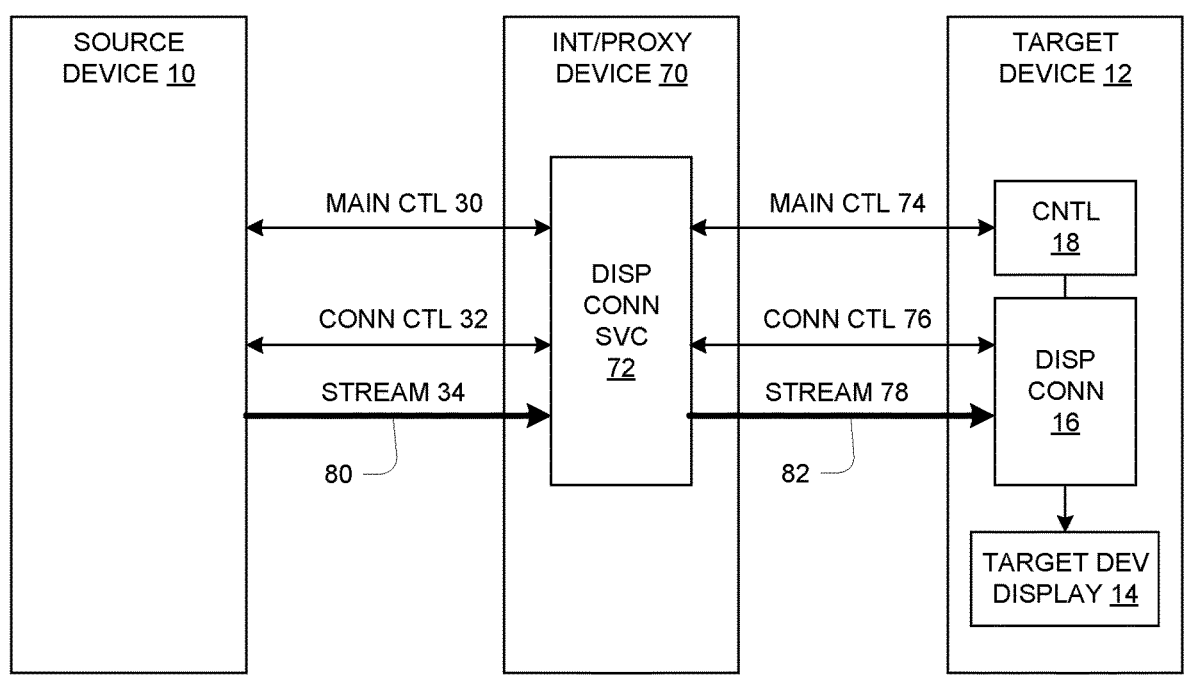
FIG. 4 is a block diagram of an alternative system arrangement employing an intermediate or proxy device.

FIG. 4 illustrates an alternative system arrangement employing an intermediate or "proxy" device 70 executing a display connector service 72. The source device 10 interacts with the proxy device 70 using the communications mechanisms 30, 32 and 34 as described above, and the proxy device 70 uses counterpart communications mechanisms 74, 76, 78 to interact with the actual target device 12 where the screen content is to be displayed (on target device display 14). In particular, the display connector service 72 operates to forward the content stream 34 received from the source device 10 to the target device 12 for displaying the content of the source device display screen. In this arrangement, the display connection between the source device 10 and the target device 12 is a compound connection including a first part 80 extending between the source device 10 and the proxy device 70, and a second part 82 extending between the proxy device 70 and the target device 12.

While various embodiments of the invention have been particularly shown and described, it will be understood by those skilled in the art that various changes in form and details may be made without departing from the scope of the invention as defined by the appended claims.

What is claimed is:

1. A method of casting a source device display screen to a target device, comprising:
by an application, storing information about the target device in a shared memory and issuing a request to an operating system to initiate capturing and casting for the source device display screen, the operating system responding to the request by launching a casting extension and supplying a content stream containing content of the source device display screen; and
by the casting extension upon being launched, (1) obtaining the information about the target device from the shared memory and using the information to establish a display connection with the target device, and (2) forwarding the content stream to the target device on the display connection,
wherein:
the target device supports a remote display protocol that is not supported by the operating system of the source device;
the operating system uses a screen display replay function to supply the content stream as a raw broadcast stream; and
the casting extension is operative to generate a processed broadcast stream from the raw broadcast stream and provide the processed broadcast stream to the target device according to the display protocol.

2. The method of claim 1, further including, by the application, interacting with the target device to obtain the information about the target device.

3. The method of claim 2, wherein interacting with the target device includes scanning a QR code displayed on a display of the target device and decoding the QR code to obtain the information about the target device.

4. The method of claim 1, wherein the target device employs a display connector function to receive the processed broadcast stream and render the stream content therein on a display of the target device.

5. The method of claim 4, further including, by the casting extension upon being launched and using the information about the target device, sending a start display connector message to the target device to initiate operation of the display connector.

6. The method of claim 1, wherein the application includes a main portion and the casting extension, the main portion having an application interface for interacting with a user of the source device and for receiving the information about the target device.

7. The method of claim 6, wherein the main portion is operative to store the information about the target device in the shared memory for use by the casting extension.

8. The method of claim 6, wherein the application interface includes a scanner operative to scan a QR code displayed on a display of the target device and to decode the QR code to obtain the information about the target device.

9. The method of claim 6, wherein application interface provides for user interaction including one or more of confirmation prompts, error messages, and video stream customization options.

10. The method of claim 1, wherein the operating system employs screen capturing to obtain the content of the source device display screen.

11. The method of claim 10, wherein the content obtained by the screen capturing is content of multiple applications using the source device display screen.

12. The method of claim 1, wherein the operating system supplies the content stream as a raw broadcast stream, and the casting extension is operative to generate a processed broadcast stream from the raw broadcast stream and provide the processed broadcast stream to the target device.

13. The method of claim 12, wherein the casting extension is operative to perform one or more stream modification functions to generate the processed broadcast stream from the raw broadcast stream.

14. The method of claim 13, wherein the stream modification functions include one or more of (1) frame re-encoding, and (2) selective frame dropping for bandwidth management.

15. The method of claim 13, wherein the stream modification functions include an information overlay function for overlaying information on a rendering of the content of the source device display screen.

16. The method of claim 15, wherein the information includes one or more of a logo, a device name, and a description of the processed broadcast stream type or rate.

17. The method of claim 12, wherein the application includes gesture functionality for interpreting gestures of the source device and modifying the processed broadcast stream accordingly.

18. The method of claim 17, wherein the gestures include a privacy gesture indicating that content appearing on a display of the source device is not to be displayed on the target device, and the application is operative in response to the privacy gesture to generate the processed broadcast stream so as to remove the content that is not to be displayed.

19. The method of claim 1, wherein the display connection to the target device is a compound connection including a first part extending between the source device and an intermediate device providing a display connector service, and a second part extending between the intermediate device and the target device, the intermediate device functioning as a proxy for the target device from the perspective of the source device.

* * * * *